Dec. 18, 1928.
M. E. BERLOWITZ
1,695,679
TESTING COIL
Filed Jan. 26, 1926    3 Sheets-Sheet 2
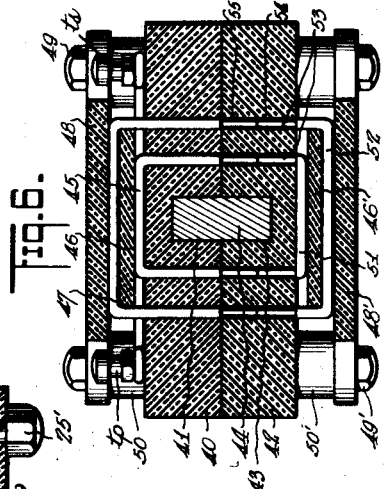
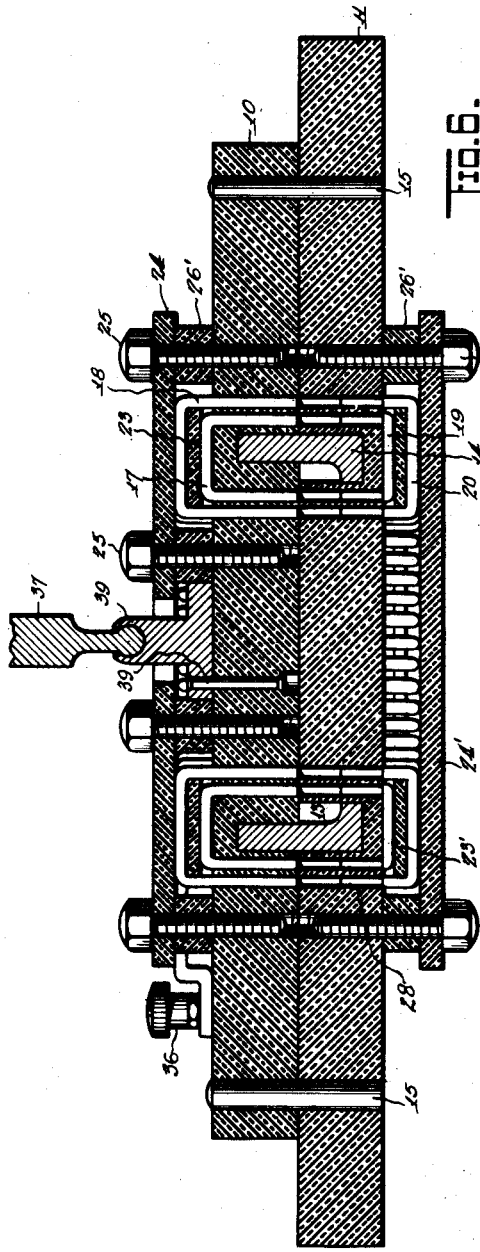
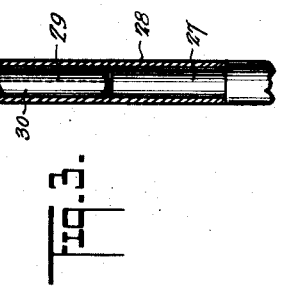
Inventor
Max E. Berlowitz
By his Attorney Dec. 18, 1928.  1,695,679
M. E. BERLOWITZ
TESTING COIL
Filed Jan. 26, 1926   3 Sheets-Sheet 3
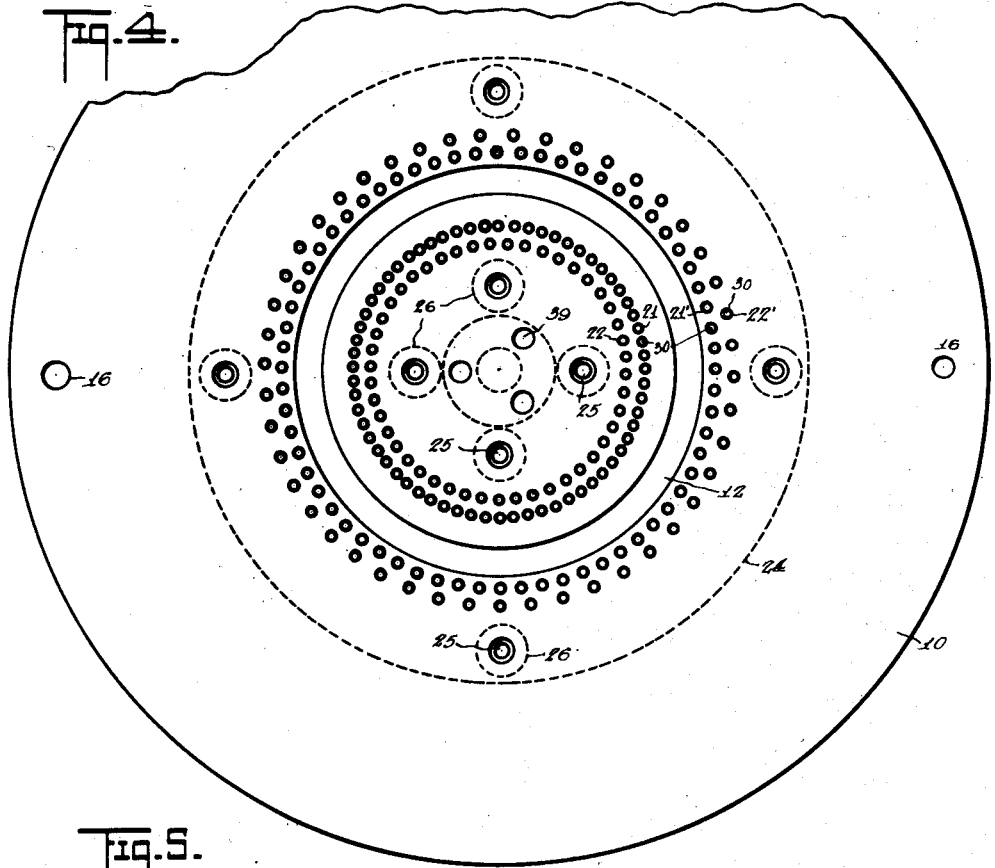
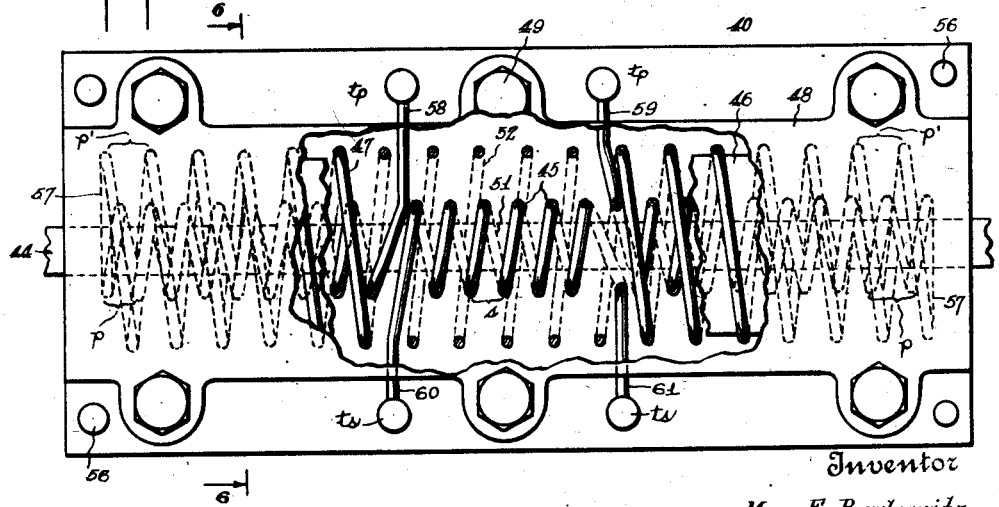
Inventor
Max E. Berlowitz
By his Attorney Patented Dec. 18, 1928.

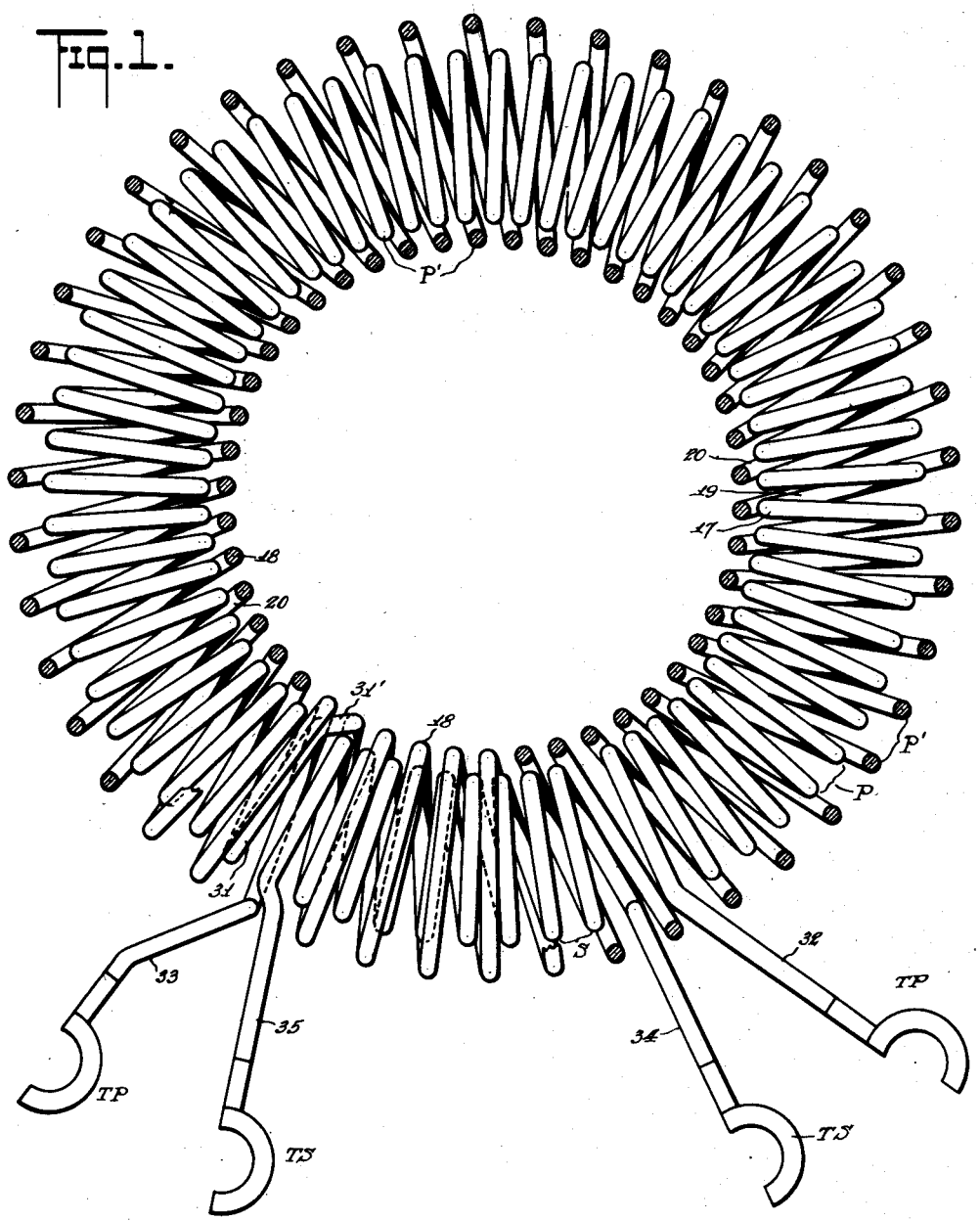

1,695,679

UNITED STATES PATENT OFFICE.

MAX E. BERLOWITZ, OF BELLEVILLE, NEW JERSEY, ASSIGNOR, BY MESNE ASSIGNMENTS, TO MAGNETIC ANALYSIS CORPORATION, OF LONG ISLAND CITY, NEW YORK, A CORPORATION OF NEW YORK.

TESTING COIL.

Application filed January 26, 1926. Serial No. 83,888.

My invention relates to improvements in testing coils and particularly to that class of coils employed in making electro-magnetic analyses or tests of magnetizable materials.

In certain classes of magnetic testing it is the practice to generate a magnetic field in the specimen to be tested and by means of a test coil in the field to indicate certain variations in the field as affected by the specimen, thereby determining or indicating certain physical characteristics of the specimen.

In the case of linear specimens it is a simple matter to pass the specimen endwise through the testing coil, but if the specimen be endless, that is, in the form of a belt or a ring, or if it be of such form or in such position that it cannot be passed endwise through the coil, the problem is not quite so simple, because in most cases it is necessary to have the coil encircle the specimen. Of course, a coil could be wound about the specimen but such a procedure would be impracticable in commercial tests of a large number of specimens owing to the time consumed in winding the coils. It is highly desirable to provide a fixed coil whose electrical characteristics have been carefully pre-determined in which the specimens may be quickly inserted one after the other, for test. It is an object of my invention, therefore, to provide such testing coil which may be employed repeatedly without dismantling and rewinding, for testing a large number of specimens of endless form.

Another object of the invention is to provide a coil which is divided transversely with respect to its windings so that it is separable into two parts which may be opened to receive the specimen after which the parts may be joined to complete the winding about the specimen.

A further object of the invention is to provide a coil which includes a secondary or detector winding as well as a primary or energizing winding, both windings being separable transversely for the reception of the specimen.

A still further object is to provide the coil at the points of separation with joints of low electrical resistance and also to provide means for quickly alining one of the separable sections of the coil with the other.

With these and other objects in view, my invention consists in certain novel features of construction and combinations and arrangements of parts as will be more fully hereinafter described and pointed out in the claims.

In the accompanying drawings:

Figure 1 is a plan view of my ring wound coil partly in section, showing only the windings, and illustrating the relation of the secondary or detector winding to the primary or energizing winding;

Fig. 2 is a cross sectional view of my improved coil showing the two separable sections joined together and enclosing an annular specimen to be tested;

Fig. 3 is a detailed view of one of the separable joints between windings of the two sections of the coil;

Fig. 4 is a bottom view partly broken away of the upper section of my coil;

Fig. 5 is a plan view partly broken away, of a modified form of coil adapted to enclose a linear part of a specimen to be tested; and Fig. 6 is a cross sectional view taken on line 6—6 of Fig. 5.

The construction shown in Figs. 1 to 4 inclusive, covers a ring wound coil adapted particularly for testing annular members, such as bearing rings, collars, etc. The coil completely encloses the specimen and includes a primary winding for generating magnetic flux which passes circumferentially about the specimen and a secondary winding within a part of the primary winding for detecting variations in such flux. The apparatus includes two plates 10 and 11 of insulating material, which are preferably of circular form. Plate 10 is superposed on plate 11 and the latter is preferably of larger diameter than the former. In the upper plate 10 there is an annular recess 12 adapted to receive the upper portion of one of the specimens to be tested and in the lower plate 11, there is a corresponding annular recess 13 adapted to receive the lower part of the specimen. A specimen is indicated at 14 which is in the form of a ring with an inwardly projecting flange at its lower end, and, to accommodate this flange, the lower recess 13 is made wider than the upper recess. It will be understood of course, that the form of the recesses 12 and 13 will depend upon the form and size of the specimens to be tested. In order to aline the plate 10 with plate 11, dowel pins 15 are secured in the latter which enter openings 16 in the upper plate.

Ring wound about the specimen are a primary winding and a secondary winding. The number of turns in each winding may be varied to suit different requirements. In the particular construction illustrated I arrange the primary in two layers P and P' (Fig. 1) of which the inner layer P forms an incomplete ring, leaving a gap for the secondary winding S, and is then expanded to form the outer layer P' which continues around the secondary and the inner primary layer, as may be clearly seen in Fig. 1. The outer layer P' thus forms a complete ring. The primary terminals are indicated at TP, TP and the secondary terminals are brought out from between the turns of the primary lapers at TS, TS.

Individual turns of each winding are formed of pairs of opposed U-shaped conductors or wires carried by the plates 10 and 11 respectively, those in plate 10 being inverted. The inverted U-shaped conductors forming the secondary winding S and the inner layer P of the primary winding are indicated by the reference numeral 17 while the conductors forming the outer layer are indicated by the numeral 18. Corresponding but opposed inner and outer U-shaped conductors carried by the lower plate 11 are indicated by the reference numerals 19 and 20 respectively. The U-shaped conductors are held in proper alined relation by passing them through perforations in the plates 10 and 11. To this end plate 10 (as shown in Fig. 4) is provided with four concentric circular rows of perforations, there being two rows on one side and two on the other side of the annular recess 12. The two rows of perforations 21 and 21' immediately adjacent said annular recess and on opposite sides thereof, are adapted to receive the legs of the inner conductors 17 while the outer rows of perforations 22 and 22' are adapted to receive the legs of the outer conductors 18. In assembling the upper part of the coil, the legs of conductors 17 are first fitted into opposite perforations 21 and 21', after which an annular plate 23 of insulating material is laid upon them. Thereafter the conductors 18 are introduced into the perforations 22 and 22', spanning the plate 23, and they are then clamped in position upon the plate 10 by an insulating plate 24 which rests upon them and is secured to the plate 10 by bolts 25 which pass through suitable collars or spacers 26.

The lower plate 11 is similarly provided with four circular rows of perforations which are alined with the perforations in the upper plate. In these perforations are positioned the legs of the U-shaped conductors 19 and 20 which are spaced apart at the bottom of the plate by an annular member 23' of insulating material and then are clamped to the plate 11 by an annular clamping plate 24' secured to the plate 11 by bolts 25' which pass through suitable spacers 26'. The legs of the lower members 19 and 20 are of a length sufficient to pass only part-way through the plate 11, and the portions of these legs which enter the plate 11 are reduced, as indicated at 27 in Fig. 3, to enter sleeves 28 which have an outside diameter adapted snugly to fit the perforations in plate 11. These sleeves terminate flush with the upper face of plate 11. The sleeves 28 are of spring metal and are secured by soldering, brazing, or in any other suitable manner, to the legs of the conductors 19 and 20. The upper ends of the sleeves 28 are slotted, as indicated at 29, and are slightly contracted. The upper conductors 17 and 18 are provided with reduced extensions 30 which project from the bottom face of the plate 10 and are adapted to enter the sleeves 28. The lower ends of the extensions are slightly rounded so that they will readily enter the sleeves 28, expanding the latter and forming a comparatively tight joint when the plates 10 and 11 are moved into contact. The extensions 30 reach far into the sleeves 28 providing a long contact surface which insures an electrical connection of low resistance at these points of juncture.

In assembling the conductors it will be observed that the conductors 19 and 20 in the lower plate are angularly disposed with respect to the corresponding conductors 17 and 18 in the upper plate so that each of the lower conductors will connect two adjacent conductors in the upper plate, thereby providing a continuous spiral path for electric current running throughout the windings as clearly shown in Fig. 1. The conductors 17, 18, 19 and 20 are respectively of uniform size and form, with the exception of a conductor 31 which forms the connecting link between the inner and outer layers of the primary winding. This conductor, as shown in Fig. 1, has a wider span than the other conductors 17 and is formed with an offset 31' so that it will reach from a perforation 21 to a perforation 22' without touching the adjacent conductor of the secondary winding. The only other variations in form are to be found in the conductors 32, 33, 34 and 35, which lead to the terminals of the windings and are substantially L-shaped. Conductor 32 leading from a perforation 21 provides one terminal conductor of the primary coil, while the other terminal of the primary coil is formed of conductor 33 leading from a perforation 22' at the opposite end of the coil. Similarly, conductor 34 is led from a perforation 21' at one end of the secondary winding and the conductor 35 from a perforation 21 at the other end of the secondary winding. These terminal conductors are provided with suitable terminal eyes or hooks (as indicated in Fig. 1) to engage binding posts 36, one of which is illustrated in Fig. 2. The terminal conductors are held in position in the plate 10 by the clamping plates 23 and 24. It will be understood of course, that the legs of the terminal conductors which enter the perforations are also provided with reduced extensions 30 to enter sleeves 28.

For convenience in handling the upper plate I provide a handle 37 connected by ball and socket joint with the socket member 38 which in turn is secured by rivets 39 to the plate 10. It will now be evident that plates 10 and 11 may be readily pulled apart for the insertion or removal of a specimen after which they may be joined again to enclose the specimen within the primary and secondary windings. Because the dowel pins 15 are longer than the extensions 30 of the upper conductors the plates 10 and 11 are properly alined before the extensions 30 are moved into engagement with the sleeves 28 and, as explained above, the extensions 30 have rounded ends which will insure their entering the sleeves 28 even though they might be slightly displaced from accurate alinement.

In Figs. 5 and 6, I have shown a modified form of coil adapted particularly for use in testing linear specimens. This coil corresponds very closely to that shown in the other figures of the drawings except that it is linear rather than annular in general form. As shown in Fig. 5 the primary winding comprises an inner layer $p$ and an outer layer $p'$, the inner layer being formed in two sections with a gap between the sections to receive the secondary winding $s$. At their adjacent ends the sections of the inner layer $p$ have extensions leading to terminal binding posts $tp$, $tp$, while at the opposite ends the windings of the layer $p$ are expanded to join windings of the outer layer $p'$ which extends over the inner layer and continues across the secondary winding $s$. The ends of the secondary winding are brought out between the turns of the layer $p'$ to terminal binding posts $ts$, $ts$.

In the construction of this coil I use an upper plate 40 of insulating material formed with a recess 41 on the underside of the plate and running lengthwise thereof. A lower plate 42 of insulating material, is similarly provided with a recess 43 in the upper face thereof, which recess is adapted to register with the recess 41, when the two plates are joined, to provide a chamber in which the specimen to be tested is received. Such a specimen is shown in the drawing at 44. The plate 40 is provided with two inner rows of perforations extending vertically therethrough adjacent the recess 41 and on opposite sides thereof, to receive the legs of a set of inverted U-shaped conductors 45. Over these conductors is placed a plate 46 of insulating material. An outer pair of rows of perforations is also formed in the plate 40, one row on each side of the aforementioned inner rows, to receive the legs of a set of inverted U-shaped conductors 47 which span the plate 46. Over the conductors 47 is placed a top plate 48 of insulating material, which is clamped to the plate 40 by means of bolts 49 which pass through suitable spacers 50. Similarly, plate 42 is formed with two inner rows of perforations to receive the legs of a set of U-shaped conductors 51 and two outer rows of perforations to receive the legs of a set of U-shaped conductors 52. A plate of insulating material 46' is fitted between the conductors 51 and 52 and they are clamped to the plate 42 by a bottom plate 48' of insulating material secured by clamping screws 49' which pass through suitable spacers 50'. The legs of the conductors 51 and 52 are formed with reduced portions 53 adapted to enter sleeves 54 which fit the perforations in the plate 42. The extensions 53 are secured to the sleeves by any suitable means which will provide a good electrical connection therebetween and they extend only part way through the sleeves so as to provide sockets for reduced extensions 55 formed on the legs of the upper inverted U-shaped conductors 45 and 47. The sleeves 54 which are of spring metal are slotted at their upper ends and slightly contracted so as to provide a friction tight joint between the sleeves 54 and extensions 55. To insure proper alinement of the plates 40 and 42 so as to bring the extension 55 into registry with the sleeves 54, dowel pins 56 are secured to the lower plate 42 and are adapted to enter openings formed in the upper plate 40.

By referring to Fig. 5, it will be observed that the inverted U-shaped conductors 45 of the windings $p$ and $s$ are angularly disposed in one direction and the U-shaped conductors 51 in another direction, so that when the two plates 40 and 42 are joined each conductor 51 will connect two adjacent members 45 forming a continuous spiral winding about the specimen 44. Similarly, the inverted U-shaped conductors 47 are oppositely inclined with respect to the U-shaped conductors 52; but while the inner layer $p$ and the winding $s$ form a spiral corresponding to a left hand screw thread, the layer $p'$ forms a spiral corresponding to a right hand screw thread. Nevertheless, if the course of the primary be traced through one section of the inner layer $p$, the outer layer $p'$ and back through the other section of layer $p$, it will be observed that the magnetic lines of force generated by the passage of a current through the two layers of the primary will not be opposed but will have the same direction.

As in the previous construction described, the U-shaped conductors 45, 47, 51 and 52 are all respectively of uniform shape and dimensions and the only variation is to be found in the U-shaped conductors 57 at each end of the coil which connect the two layers $p$ and $p'$. The conductors 57 differ from conductors 52 only in being narrower than the latter. Terminal conductors which are generally L-shaped connect the ends of the windings $p$ and $s$ with the terminal posts. For instance, the ends of the sections of the inner layer $p$ are provided with L-shaped conductors 58 and 59 respectively running to the binding posts $tp$, $tp$ and the ends of the secondary winding $s$ are provided with L-shaped conductors 60 and 61 running to the binding posts $ts$, $ts$. The general arrangement of these conductors may be seen in Fig. 5.

The advantage of this particular construction will be obvious. The coil may be fitted about any linear object even when the ends of the object are inaccessible. For instance, the coil could be clamped about an elevator cable to make tests of the condition of the cable. It is obvious that variations could be made in the form of the windings. For instance, the primary could consist of a single layer or of more than two layers, and similarly the secondary could be varied at will. If desired, the secondary could be made of two opposed coils which would permit of making magnetic leakage tests similar to those described in the patent of Charles W. Burrows, No. 1,322,405 dated November 18, 1919, Reissue No. 15,859, dated June 17, 1924.

Numerous slight changes and alterations may be made in the general form and arrangement of the parts described without departing from the spirit of my invention and hence I do not wish to limit myself to the precise details set forth but shall consider myself at liberty to make such changes and alterations as fall fairly within the scope of the appended claims.

I claim:

1. In a testing coil of the character described two plates of insulating material each formed with a recess on the inner face thereof and combining to form a core chamber when the plates are joined with said faces in contiguity, each plate being further formed with an inner and an outer series of perforations at each side of the recess, a series of inner U-shaped conductors carried by each plate, said conductors spanning the recess with the yokes of the conductors lying on the outer face of the plate and the legs of the conductors entering the inner series of perforations, an outer series of U-shaped conductors carried by each plate with the legs of the conductors entering the outer series of perforations, insulating material separating the yokes of the outer conductors from the yokes of the inner conductors, means for clamping the outer series of conductors to the plate, and socket members engaging the legs of the conductors carried by one plate and adapted to receive the legs of the conductors carried by the other plate to complete a winding about said core chamber.

2. The combination set forth in claim 1, together with binding posts carried by one of the plates, and terminal conductors connecting the ends of the winding to said binding posts respectively.

3. In a testing coil of the character described, two plates of insulating material, each formed with a recess on the inner face thereof, and combining to form a core chamber when the plates are joined with said faces in contiguity, each plate being further formed with an inner and an outer series of perforations at each side of the recess, a series of inner U-shaped conductors carried by each plate, said conductors spanning the recess with the yokes of the conductors lying on the outer face of the plate and the legs of the conductors entering the inner series of perforations, an outer series of U-shaped conductors carried by each plate with the legs of the conductors entering the outer series of perforations, insulating material separating the yokes of the outer conductors from the yokes of the inner conductors, means for clamping the outer series of conductors to the plate, socket members engaging the legs of the conductors carried by one plate to form two layers of windings about said core chamber, and a conductor adapted to connect one layer with the other.

4. In a magnetic testing device two supporting frames of insulating material, inner and outer sets of substantially U-shaped conductors carried by each frame, means for electrically connecting the legs of each set of inner and outer U-shaped conductors to the legs of another set of inner and outer U-shaped conductors respectively, the conductors of each set being angularly disposed with respect to the conductors of the other corresponding set to form a helix when the two sets are connected, and a conductor adapted to connect said inner and outer sets.

5. In a magnetic testing device, two supporting frames of insulating material, a set of substantially U-shaped conductors angularly disposed with respect to each other and carried by each frame, means for electrically connecting each leg of one set of said conductors with a leg of said other set to form in effect a series of helical windings, one portion of said windings being interconnected to form a primary coil, and another portion of said windings being interconnected to form a secondary coil positioned between terminal windings of said primary coil.

6. In a magnetic testing device, two supporting frames of insulating material, an inner set of substantially U-shaped conductors angularly disposed with respect to each other and carried by each frame, an outer set of substantially U-shaped conductors angularly disposed with respect to each other and carried by each frame, means for electrically connecting each leg of one set of the conductors carried by one frame with a leg of another set carried by the other frame to form in effect an inner series and an outer series of helical windings, the windings of one series being interconnected and connected with a portion of the windings of the other series also interconnected to form a coil, and the remaining windings of said other series being interconnected to form a separate coil.

MAX E. BERLOWITZ.